(12) United States Patent
Ahtikari (10) Patent No.: US 11,042,136 B2
(45) Date of Patent: Jun. 22, 2021

(54) ENERGY MANAGEMENT BASED ON MULTIPLE SIGNALS

(71) Applicant: Liikennevirta Oy/Virta Ltd, Helsinki (FI)

(72) Inventor: Jussi Ahtikari, Helsinki (FI)

(73) Assignee: Liikennevirta Oy/Virta Ltd, Helsinki (FI)

( * ) Notice: Subject to any disclaimer, the term of this patent is extended or adjusted under 35 U.S.C. 154(b) by 162 days.

(21) Appl. No.: 16/347,003

(22) PCT Filed: Dec. 11, 2018

(86) PCT No.: PCT/FI2018/050899
§ 371 (c)(1),
(2) Date: May 2, 2019

(87) PCT Pub. No.: WO2019/175467
PCT Pub. Date: Sep. 19, 2019

(65) Prior Publication Data
US 2020/0379419 A1    Dec. 3, 2020

(30) Foreign Application Priority Data
Mar. 15, 2018    (FI) .................................... 20185247

(51) Int. Cl.
G05B 15/02    (2006.01)
G06Q 10/04    (2012.01)
H02J 3/32     (2006.01)

(52) U.S. Cl.
CPC ............. *G05B 15/02* (2013.01); *G06Q 10/04* (2013.01); *H02J 3/32* (2013.01)

(58) Field of Classification Search
None
See application file for complete search history.

(56) References Cited

U.S. PATENT DOCUMENTS

| 6,018,690 A    | 1/2000 | Saito et al. |
| 8,710,810 B1 * | 4/2014 | McJimsey ............. H02M 3/157 323/272 |
| 2010/0145540 A1 | 6/2010 | McKenna |

(Continued)

FOREIGN PATENT DOCUMENTS

| EP | 3 029 795 A1   | 6/2016 |
| WO | WO 2013/100764 A1 | 7/2013 |

OTHER PUBLICATIONS

International Search Report for corresponding International Patent Application No. PCT/FI2018/050899 dated Feb. 12, 2019, 5 pages.

(Continued)

*Primary Examiner* — Mohammad Ali
*Assistant Examiner* — Saad M Kabir
(74) *Attorney, Agent, or Firm* — Merchant & Gould P.C.

(57) ABSTRACT

A computer device configured to monitor control signals from more than one adjustment system indicating a need to adjust operation of at least one energy storage; convert the control signals into current values; compare the control signals and select the one with the smallest current value; and control operation of at least one control device configured to regulate the current of the energy storage based on the selection by dispatching an adjustment signal by internet based communication.

14 Claims, 7 Drawing Sheets

(56) References Cited

U.S. PATENT DOCUMENTS

2014/0070756 A1    3/2014   Kearns et al.
2014/0084874 A1    3/2014   Eger et al.

OTHER PUBLICATIONS

Written Opinion of the International Searching Authority for corresponding International Patent Application No. PCT/FI2018/050899 dated Feb. 12, 2019, 7 pages.
Finnish Search Report for corresponding Finnish Patent Application No. 20185247 dated Oct. 25, 2018, 2 pages.
Law, YW et al., "Demand Response Architectures and Load Management Algorithms for Energy-Efficient Power Grids: A Survey", Proceedings of the Seventh International Conference on Knowledge, Information and Creativity Support Systems (KICSS), pp. 134-141 (2012).
Manninen, K., "Rakennusten Kysntäjoustomallinnuksen Vaatimusten Määritys", Master's Thesis, Lappeenranta University of Technology (2017), retrieved from the Internet: http://www.doria.fi/handle/10024/134517; Abstract.

* cited by examiner

ENERGY MANAGEMENT BASED ON MULTIPLE SIGNALS

This application is a National Stage Application of PCT/FI2018/050899, filed Dec. 11, 2018, which claims benefit of Application Serial No. 20185247, filed Mar. 15, 2018 in Finland and which applications are incorporated herein by reference. To the extent appropriate, a claim of priority is made to each of the above disclosed applications.

TECHNICAL FIELD

The present application relates to the field of energy management, and more particularly to the controlling of power of electrical energy storages.

BACKGROUND

Energy storages, such as battery systems, may be used to store energy. The stored energy may be charged, for example, from the grid. In general, some systems may regulate the energy storage charging and discharging based on different business rules. Further, multiple parties or systems may want to simultaneously regulate the power of energy storages according to their interests. When multiple systems ask for different adjustments, appropriate regulation may not be made.

A patent publication EP 3029795 A1 discloses information that may be regarded as useful for understanding the background.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a solution for controlling charging and discharging currents of energy storages based on multiple signals, for example coming simultaneously from multiple independent controlling systems. The embodiment is advantageous in a way that the control is implemented by a single system such that there can be many fully independent adjustment systems, which may not be aware of each other, and which may request controlling the same energy storage simultaneously and independently of each other. For example, instead of sending multiple adjustment commands directly to energy storages, or their control devices, a computer device is provided for monitoring the adjustment commands and sending a single adjustment signal for each control device and respective energy storages. The computer device is configured to convert the received signals into electrical current values, and compare the values in order to select the signal with the smallest value. Therefore, safety aspects may be taken into account while conducting regulation of operation of energy storages.

According to a first aspect, there is provided a computer device for energy management. The computer device is configured to monitor control signals from more than one adjustment systems indicating a need to adjust operation of at least one energy storage; convert the control signals into current values; compare the control signals and select the one with the smallest current value; and control operation of at least one control device configured to regulate the current of the energy storage based on the selection by dispatching an adjustment signal by internet based communication. The provided computer device may enable energy management based on multiple signals such that the optimum signal is selected to ensure safety while taking into account all control requests. In addition, because each control signal from the different adjustment systems is converted into current value for comparison, the device may be able to take into account a variety of control signals which may be based on different control logics and use different kinds of indications to control the energy storage or energy storages.

In an embodiment, the computing device is configured to monitor the control signals so as to receive the control signals from more than one adjustment system; store the received control signals in a memory; and update the stored information to comprise only active control signals. The embodiment may enable up-to-date monitoring of the control requirements.

In an embodiment, the computing device is configured to update the stored information by replacing the previously received control signals with the respective new control signals. The embodiment may enable keeping the adjustment requirements up-to-date.

In an embodiment, the computing device is configured to update the stored information by removing the control signal from the memory when a corresponding activity time has expired. The embodiment may enable keeping the adjustment requirements up-to-date.

In an embodiment, the computing device is configured to update the stored information by removing the control signal in response to receiving a cancellation signal. The embodiment may enable keeping the adjustment requirements up-to-date.

In an embodiment, the computing device is configured to store the control signals in control device specific lists. Thus, the charging and discharging currents of each energy storage may be controlled individually.

In an embodiment, in addition or alternatively, the computer device is further configured to determine groups, each group comprising at least one control device configured to regulate the current of the energy storage; determine which of the groups are affected by each received control signal; store the received control signals in group specific lists; compare the control signals within each group specific list; and control operation of each control device according to the comparison. The embodiment enables taking into account group specific control requirements in controlling the currents of each control device and the respective energy storages.

In an embodiment, in addition or alternatively, the adjustment signal comprises a command to adjust a charging value to the current value or to adjust a discharging value to the current value. Thus, the computer device may be able to control both energy consumption and energy supply.

In an embodiment, in addition or alternatively, the control signals comprise a regulation request based on at least one of dynamic load management, static maximum current, frequency control, demand response, electricity supply and demand state, or building energy management. Thus, the computer device may be able to take into account energy management requests from multiple sources.

In an embodiment, in addition or alternatively, the computer device is further configured to determine priorities for the control signals; group the control signals into priority groups based on the determined priorities; and compare the current values only within a top priority group with active control signals. The embodiment may enable prioritizing the energy management requests.

In an embodiment, the computer device comprises at least one processor configured to control operations of the computer device; a communications module configured to communicate with the at least one control device; and at least one memory coupled to the at least one processor and the communications module, and configured to store program instructions which, when executed by the at least one processor, causes the device to perform the control operations.

In an embodiment, the internet based communications comprises at least one of open charge point protocol, OCPP, open smart charging protocol, OSCP, and protocols of different manufacturers. Thus, operations of plurality of energy storages may be controlled extensively irrelative of their locations or manufacturers.

According to a second aspect, there is provided a method for energy management. The method comprises monitoring control signals from more than one adjustment system indicating a need to adjust operation of at least one energy storage; converting the control signals into current values; comparing the control signals and selecting the one with the smallest current value; and controlling operation of at least one control device configured to regulate the current of the energy storage based on the selection by dispatching an adjustment signal by internet based communication. The method may enable energy management based on multiple signals, for example coming simultaneously from multiple different adjustment systems.

According to a third aspect, there is provided a computer program comprising program code which, when executed by at least one processing unit, causes the at least one processing unit to perform a method according to the second aspect.

In an embodiment, the computer program is embodied on a computer readable medium.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

According to an embodiment, a computer server may control the charging and discharging power of energy storages. The charging and discharging power control may be based on comparing control signals received from adjustment systems. The best option of the control signals may be selected by comparison in order to find the signal requesting the smallest current value. The charging or discharging power of each energy storage may be adjusted according to the selection.

Each energy storage comprises a control device configured to control the current of the energy storage. The control devices may further comprise communication modules. The computer server communicates with the modules by the internet. This may be wireless or wired communication. The computer server may operate at the cloud. The computer server is configured to communicate with the communication modules using various protocols. Consequently, the control devices and respective energy storages may be manufactured by different manufacturers. The communication can be based on, for example, the control device being an electric vehicle charging station, an electric vehicle charging protocol or a charging station manufacturer specific protocol. Alternatively or in addition, the control device may be located in a stationary energy storage with a connection to the grid. The stationary energy storage may refer to, for example, an energy storage configured to store energy produced with renewable energy sources.

Figure 1:
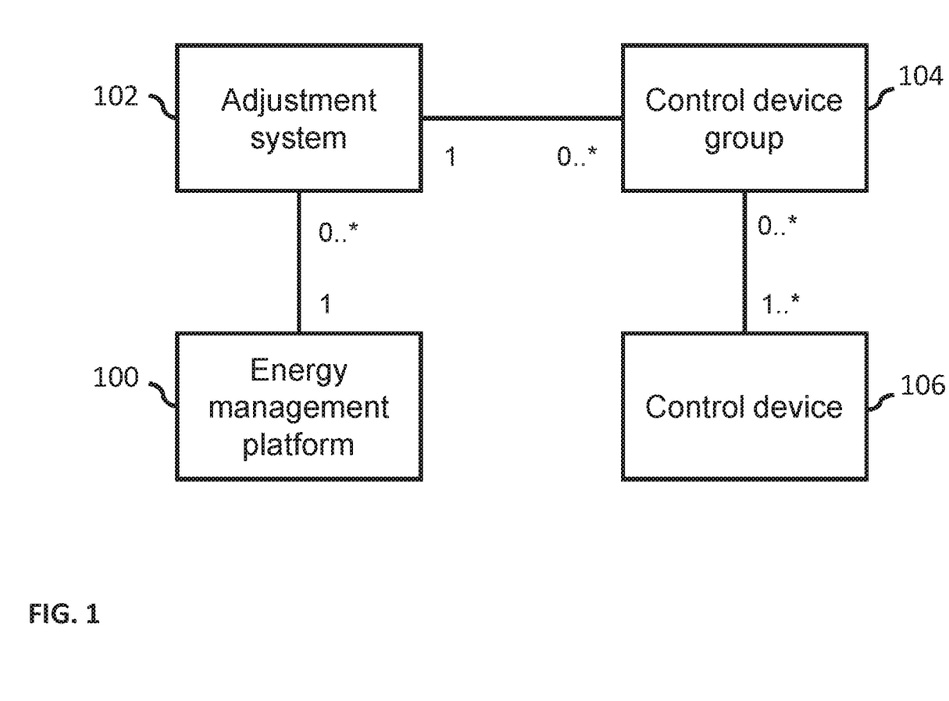
FIG. 1 illustrates a schematic representation of a block diagram of an energy management system according to an embodiment.

FIG. 1 illustrates a schematic representation of a block diagram of an energy management system according to an embodiment. An energy management platform 100 may control the currents of control devices 106 based on multiple signals. The signals may be coming simultaneously from multiple independent controlling systems.

The energy management platform 100 may control operation of one or more control devices 106 configured to regulate the current of an energy storage. The controlling may be based on control signals received from more than one adjustment systems 102. The adjustment systems 102 may be independent of each other. A single energy storage may be controlled simultaneously by multiple independent adjustment systems 102. Each adjustment system 102 may dispatch control signals indicating a demand for regulating operation of the energy storage based on its individual rules and logic. As an example, one adjustment system 102 may dispatch control signals based on the electricity grid status and another one based on the charging demand of, for example, electric vehicles. Instead of one adjustment system controlling the operation of the energy storage, the energy management platform 100 enables controlling the operation based on multiple signals coming simultaneously from independent adjustment systems. Thus, instead of the control being based on interest of a single operator, the control may be based on safety aspects while simultaneously taking into account the demands of multiple operators/systems. In an embodiment, the energy management platform 100 controls the currents of a plurality of control devices 106. The energy management platform 100 may be configured to group the control devices 106 into one or more control device groups 104. The controlling of different groups' currents may be based on different signals received from the adjustment systems 102. The energy management platform 100 may be a computer server. The computer server may be configured to receive and dispatch signals using wireless or wired communication means. The control device 106 may be, for example, a component of a stationary energy storage or an electric vehicle charging station configured to charge and discharge batteries on electric vehicles. The adjustment system 102 may refer to an entity monitoring a state or safety of a system or equipment, such as a grid operator monitoring the grid, a building energy management system, safety equipment, or a dynamic load management system. The adjustment systems 102 may dispatch signals automatically or manually by an operator. The control signals may be received from any kind of adjustment system 102, and the control command may be in any form, such as a current value, a request to decrease or increase current, or any other indication used by the adjustment system 102. The control signaling received from the adjustment systems 102 may comprise, for example, frequency control, demand response request, supply-demand state indication, static maximum current of the energy storage or the control device, safety equipment signals or building energy management. The computer server is able to convert the different control signals into current values so that the signals may be compared to select the one requesting the smallest value.

Figure 2:
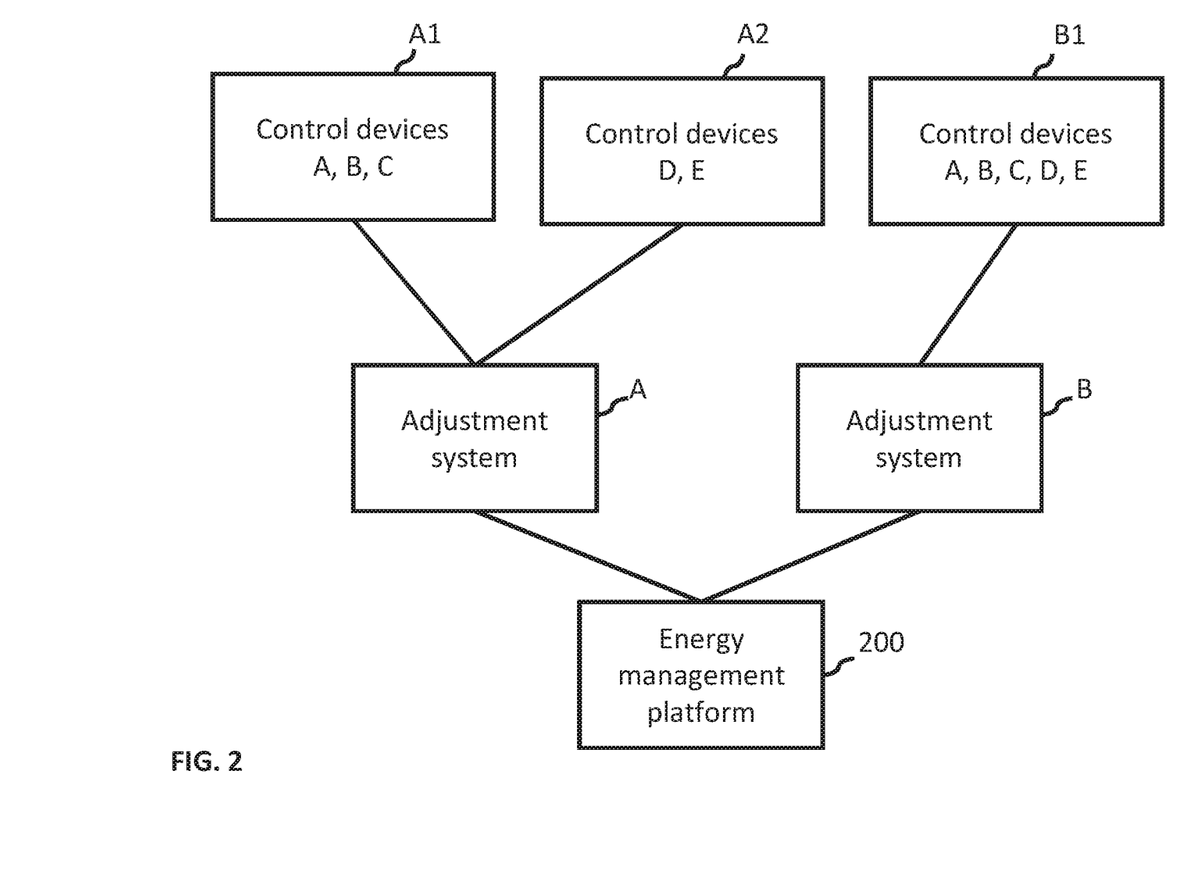
FIG. 2 illustrates a schematic representation of a block diagram of an exemplary energy management system configuration according to an embodiment.

FIG. 2 illustrates a schematic representation of a block diagram of an exemplary energy management system configuration according to an embodiment. The configuration demonstrates how the control of charging or discharging currents may be based on multiple signals.

In the exemplary configuration, the energy management platform 200 may monitor signals of two adjustment systems, adjustment system A and adjustment system B. Adjustment system A has two groups, group A1 and group A2. Group A1 comprises control devices A, B and C, and group A2 comprises control devices D and E. Adjustment system B has only group B1, but the group comprises all the control devices A, B, C, D and E, which also belong to groups A1, A2 of adjustment system A.

For example, adjustment system A may be a dynamic load management system, DLM. Adjustment system B may refer to frequency control. In a conventional system, control devices A, B, C, D and E may receive control signals from both adjustment systems A, B asking them to do different things. For example, DLM might ask the control devices in group A2 to raise their charging current, and at the same time frequency control may signal the control devices of group B1 to lower their charging current. Thus, the control device may be unable to make a decision according to which signal the current should be adjusted, or it might make a poor decision which may lead to, for example, overloading a fuse or a grid.

In the embodiment illustrated in FIG. 2, the energy management platform 200 may receive the DLM and frequency control signals. No signal may be dispatched directly to the control devices by adjustment systems A, B. The energy management platform 200 may be configured to convert the control signals into current values. For example, the frequency control signal may ask control devices of group B2 to decrease their consumption. The energy management platform 200 may convert the frequency control signal into a value of 6 A, which may be a minimum charging current value. At the same time, DLM signal asks the control devices to raise their current to 15 A. The energy management platform 200 then compares the current values and selects the smallest value. A lower value may indicate a need to protect something. For example in the above example the lower value requested by the frequency controlling is selected in order to help maintain the power balance and stability of the grid, even though DLM indicates that the charging current may be raised.

Figure 3:
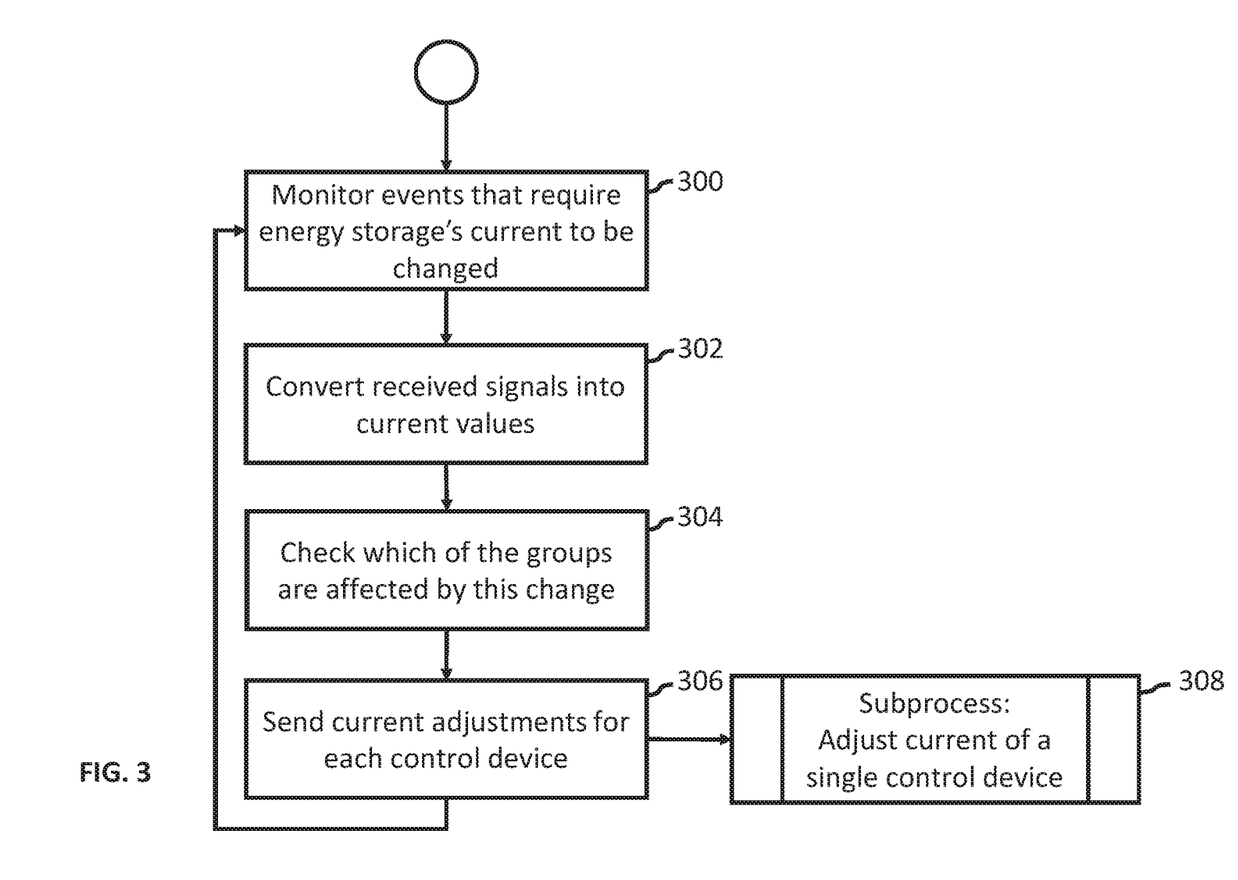
FIG. 3 illustrates a schematic representation of a flow diagram of energy management according to an embodiment.

FIG. 3 illustrates a schematic representation of a flow diagram of energy management according to an embodiment.

At operation 300, an energy management platform monitors events that require the energy storage's current to be changed. The events may refer to control signals sent from different adjustment systems in response to changes in, for example, loads or balance of the grid. The energy management platform may receive control signals and store them in a memory. The number of the stored control signals is not limited, and the energy management platform is able to continuously add signals received from new adjustment systems and take them into account in determining the control commands for the energy storages. The control signals may be stored as a list comprising all active control signals. A control signal may be active until another signal, such as a cancellation signal, is received from a corresponding adjustment system indicating that there is no more need for an adjustment. Alternatively, a control signal may be active for a specific time, such as for a day, an hour, or fifteen minutes. When a control signal is no longer active, it may be removed from the list. In addition or alternatively, an adjustment system may send another control signal with a different request, and the value of the earlier control signal from the adjustment system may be replaced with a value of the new control signal.

At operation 302, the energy management platform converts the received control signals into current values. For example, signals may be received from an adjustment system monitoring the electricity market. The state of consumption and production may be indicated through electricity prices. Thus, when the electricity price exceeds a predefined threshold, a signal may be dispatched to adjust the current to the minimum value. Similarly, when the electricity price goes below a predefined threshold, a signal may be dispatched to adjust the current to the maximum value. The minimum and maximum values may be determined by the energy management platform, and the received control signals may be converted into current values. As another example, an adjustment system may be a grid operator's system, which may send a control signal to increase production or decrease consumption for the next hour. The energy management platform may convert the control signal into an appropriate current value and, additionally, it may determine which of the control device groups are affected by it in order to meet the requirements indicated by the control signal. The energy management platform is capable to take into account various control signals and convert them into current values despite of the form of the control indication used by the different adjustment systems. Thus, each independent adjustment system may dispatch control signals based on their own control logic, and the platform is able to take into account the different signals coming from multiple sources simultaneously for controlling operations of the energy storages.

At operation 304, the energy management platform checks which of the groups are affected by the change. The control device groups may be determined, for example, based on their location, such that all control devices in the same district or country are grouped. In addition, groups may be determined according to safety equipment related to them, such as by grouping all control devices behind the same fuse. A single control device may belong to one or more groups. Thus, one control device's adjustment may depend on multiple signals, such as signals received from an energy management system of the building the control device is linked to, a control signal relating to the grid load of a city area, and consumption and production balance of a country in which the control device is located.

At operation 306, the energy management platform sends current adjustment signals for each control device. The control signals may be stored in the memory in group specific lists. Further, the control signals may be stored in control device specific lists. A requirement to change the current of a single control device may affect the current of all of the control devices in the control device group, such as in case of dynamic load management. The energy management platform may compare the control signals within the lists and select the smallest value in each control device specific list. Thereafter, the energy management platform may dispatch an adjustment signal for each control device according to the selected current value. Thus, instead of each control device receiving control signals from multiple adjustment systems with different interests, each control device may receive a single adjustment signal from the energy management platform. The energy management platform monitors all of the control signals and executes the one most suitable for each group and individual control device. Operation 308 illustrates a sub-process in which the current of a single energy storage is adjusted according to the sent current adjustment signal. The energy management platform may communicate with the control devices with internet based communication comprising various protocols; thus, the energy management platform may be able to control the operation of multiple control devices extensively, irrelevant of the location or vendor.

Figure 4:
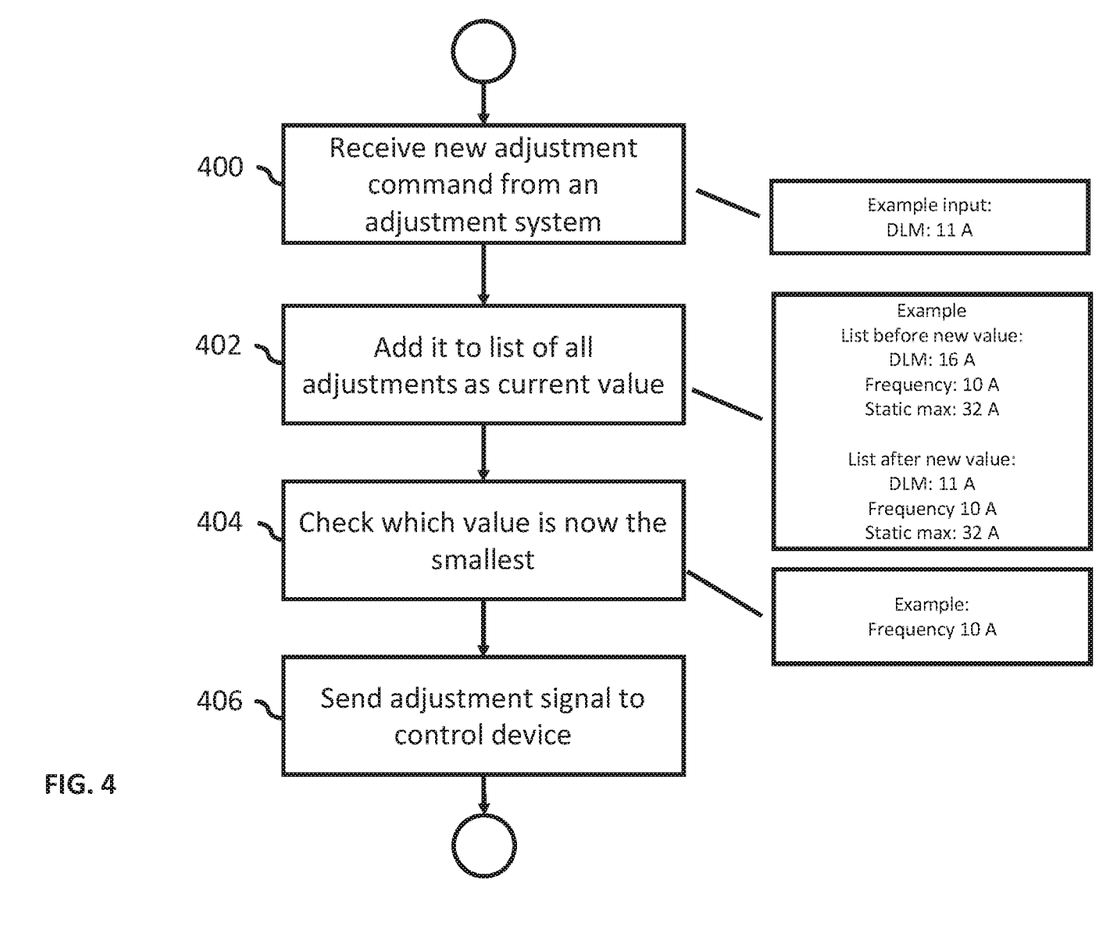
FIG. 4 illustrates a schematic representation of a flow diagram of energy management when control signals are equal.

FIG. 4 illustrates a schematic representation of a flow diagram of energy management when control signals are equal. This means that each control signal is treated equally, and the selection is made by the smallest current value.

At operation 400, a new adjustment command is received from an adjustment system. For example, a DLM control signal may have been received, indicating that a current of control devices in a specific control device group may be decreased to 11 A.

At operation 402, the energy management platform adds the control signal to a list comprising all active control signals. If the list did not include a DLM signal before, it is added to the list. If the list already included a DLM signal, the old value is replaced with the new one. In addition, one or more of the earlier control signals may be dropped due to being no longer valid. Thus, the list may be updated to comprise only the active control signals. According to the illustrated example in FIG. 4, the list before receiving the new control signal may have comprised a DLM signal (16 A), a frequency control signal (10 A), and a static maximum current signal (32 A). Therefore, the earlier DLM signal may be replaced with the new one, and the value in the list is decreased from 16 A to 11 A. If the control signal was received from an adjustment system using another indication for the adjustment need than amperes, such as up or down, 0 or 1, or the like, the energy management system may have converted the control signal into a current value before adding it to the list.

At operation 404, the energy management system checks what the smallest current value is now. In the illustrated example, even though the latest adjustment control signal came from DLM, and the value has been decreased from 16 A to 11 A, it may not be used to control operation of energy storages. When the values of all of the control signals are compared by the energy management platform, the current value of the frequency control remains the smallest. The adjustment may be made according to the smallest value on the list, and not according to the latest adjustment need.

At operation 406, the adjustment is sent to each control device. An adjustment signal is sent to each control device to set the charging current to the current value converted from the frequency control signal. Alternatively, the adjustment signal may be sent to the control device in order to set a discharging current to the determined value. Thus, in addition to being able to control the consumption of energy storages, they may be also used as a resource feeding energy to the grid.

Figure 5:
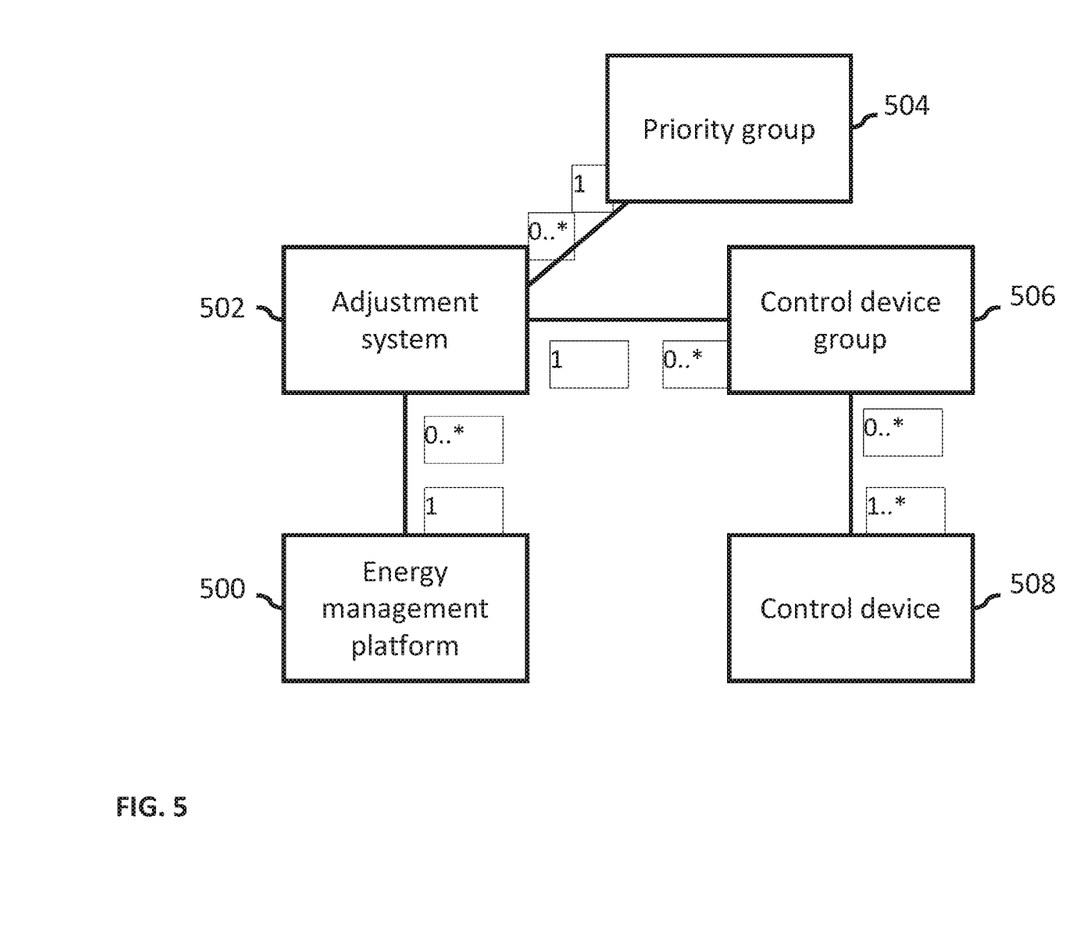
FIG. 5 illustrates a schematic representation of a block diagram of an energy management system with priority groups.

FIG. 5 illustrates a schematic representation of a block diagram of an energy management system with priority groups. Adjustment systems may be grouped into priority groups to prioritize their adjustment needs.

The energy management platform 500 may be configured to determine priorities for the adjustment systems 502 and their respective control signals. For example, the control signals may be divided into two or more priority groups 504. Control signals received from one adjustment system 502 may belong to one priority group 504. Alternatively, different control signals received from the same adjustment system 502 may have different priorities. The energy management platform 500 may take into account the priority groups 504 in controlling operation of control devices 508. The control devices 508 may be grouped as control device groups 506. A control signal may be dispatched by an adjustment system 502 to request adjusting operation of a single control device 508, a control device group, or multiple groups 506.

Figure 6:
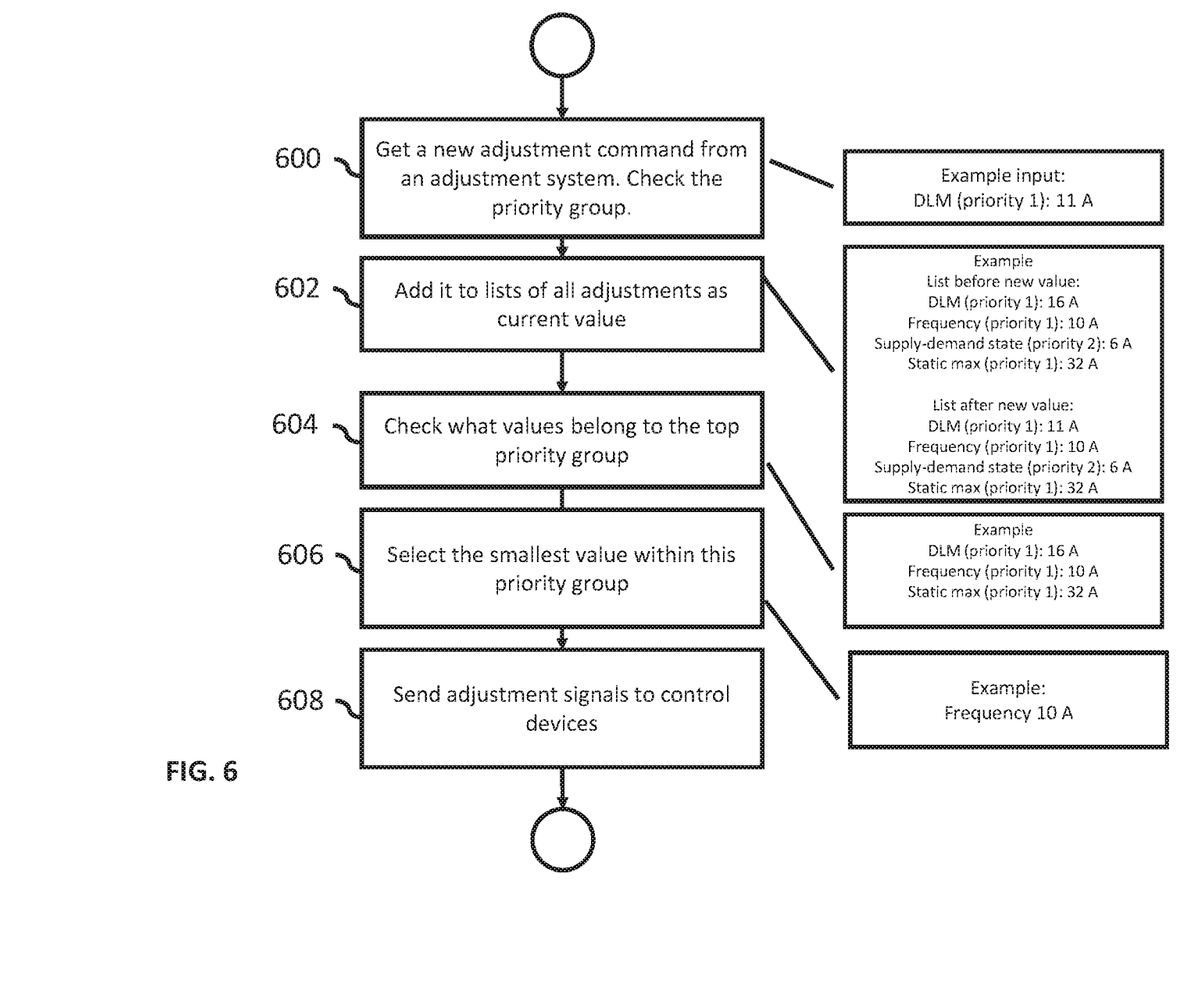
FIG. 6 illustrates a schematic representation of a flow diagram when control signals have priorities.

FIG. 6 illustrates a schematic representation of a flow diagram when control signals have priorities. In the embodiment, the selection of an adjustment signal is made based on the smallest value within a top priority group.

At operation 600 a new adjustment command is received from an adjustment system. The adjustment system may have sent a control signal indicating a need to control operation of one or more energy storages. The energy management system monitors the control signals. The energy management system also checks the priority group of each received control signal. For example, a DLM signal may have been received, requesting the charging current to be set to 11 A. The energy management platform then checks that the DLM signal belongs to priority group 1, which may be of the highest priority.

At operation 602 the received signal is added to the lists of all adjustment requests from different adjustment systems. If a list already comprised a DLM signal, the old signal is replaced with the new one. In case the received control signal did not comprise a current adjustment value, the energy management platform is able to convert the signal into an electrical current value.

At operation 604 the energy management system checks which values belong to the top priority group. For example, the list may be a control device specific list comprising the new DLM signal (priority group 1, 11 A), a frequency control signal (priority group 1, 10 A), a supply and demand state signal (priority group 2, 6 A) and a static maximum signal (priority group 1, 32 A). In the example, the DLM, frequency control, and static maximum signals belong to the top priority group. The remaining signal, supply and demand state indicating signal, belongs to a lower priority group 2. Only active signals within the top priority group are taken into account, and the other lower priority signals are ignored, no matter what their current value is.

At operation 606 the smallest value within the top priority group is selected. For example, even though the smallest value of all the control signals may be the supply and demand state signal, the signal belongs to priority group 2. Because there are active control signals in priority group 1, which is the top priority group, only control signals within the top priority group are taken into account when making the selection. Therefore, in the example illustrated in FIG. 6, the frequency control signal has the smallest value within the top priority group, and thus it is selected based on the comparison of the values. If there were no active signals in priority group 1, then the selection would be made within the next lower priority group with active signals, which would then be the top priority group.

At operation 608 the adjustment is sent to control devices. The energy management platform may dispatch an adjustment signal according to the selected current value to each control device for which the current has been requested to be adjusted.

Figure 7:
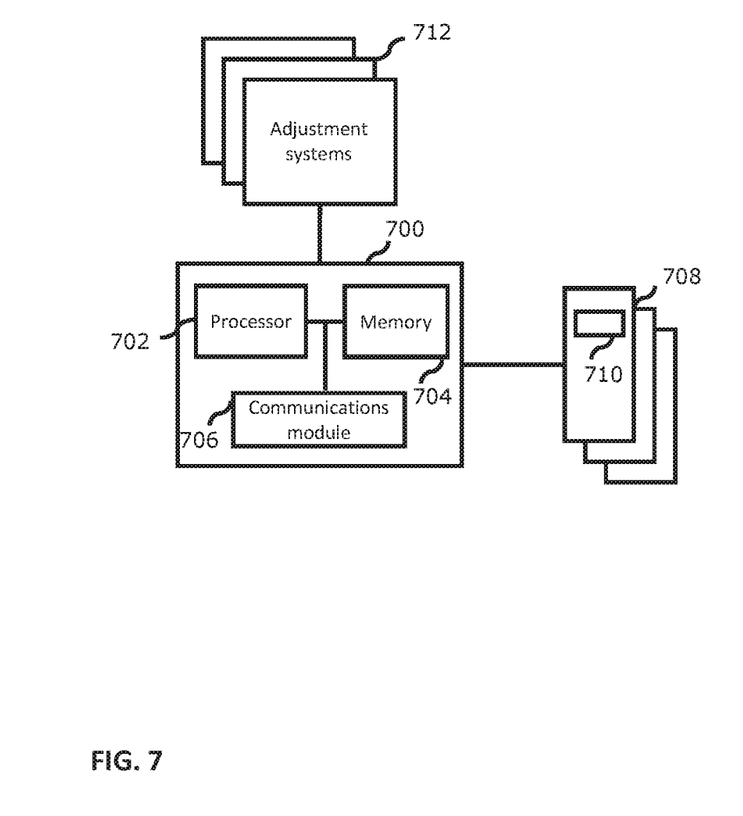
FIG. 7 illustrates a schematic representation of a block diagram of a computer device for energy management according to an embodiment.

FIG. 7 illustrates a schematic representation of a block diagram of a computer device 700 for energy management according to an embodiment.

The computer device 700 is configured to control the charging and discharging currents of at least one control device 708 by internet based communications. Each control device 708 may be configured to control operation of an energy storage. The computer device 700 may comprise at least one processor 702 connected to at least one memory 704 and a communications module 706. The at least one memory 704 may comprise at least one computer program which, when executed by the processor 702 or processors, causes the computer device 700 to perform the programmed functionality. The at least one memory 704 also stores control signals received from more than one adjustment system 712. The computer device 700 is configured to monitor the control signals and convert them into current values for comparison. The energy management may be delivered from a cloud. The at least one control device 708 may comprise a communications module 710, and the computer device 700 may be configured to communicate with the communication modules 710. The control devices 708 may be from different manufacturers. The control devices 708 may be wirelessly coupled to the computer device 700, and situated at a different location than the computer device 700. Thus, the locations and distances between the control devices 708 and the computer device 700 are not constrained.

The computer device 700 may control the charging and discharging currents of the control devices 708 by increasing or decreasing the currents according to the smallest value of control signals. The computer device 700 may be, for example, a cloud server or a distributed system. The internet based communications may comprise an open charge point protocol, OCPP, an open smart charging protocol, OSCP, and/or charging station manufacturer specific protocols. This enables controlling the charging currents remotely, and therefore no additional hardware or new physical installations are required. As the control devices may be independent of a certain vendor or model, the electricity demand and supply can be managed more comprehensively.

The functionality described herein can be performed, at least in part, by one or more computer program product components such as software components. Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus comprising:
a computer device including a processor and memory in data communication with the processor, the computer device configured to:
monitor control signals from more than one adjustment system indicating a need to adjust operation of at least one energy storage, at least one adjustment system relating to one form of control indication and at least one other adjustment system relating to a second form of control indication;
receive the control signals from more than one adjustment system;
convert two or more of the control signals into electrical current values despite the different forms of control indication used by the different adjustment systems;
compare the control signals and select the one with the smallest current value; and
control operation of at least one control device configured to regulate the current of the energy storage based on the selection by dispatching an adjustment signal by internet based communication.

2. The apparatus device of claim 1, wherein the computing device is configured to monitor the control signals so as to:
receive the control signals from more than one adjustment system;

store the received control signals in a memory; and
update the stored information to comprise only active control signals.

3. The apparatus of claim 2, wherein the computing device is configured to update the stored information by replacing one or more previously received control signals with one or more newly received control signals.

4. The apparatus of claim 2, wherein the computing device is configured to update the stored information by removing the control signal from the memory when a corresponding activity time has expired.

5. The apparatus of claim 2, wherein the computing device is configured to update the stored information by removing the control signal in response to receiving a cancellation signal.

6. The apparatus of claim 1, wherein the computing device is configured to store the control signals in control device specific lists.

7. The apparatus of claim 1, further configured to:
determine groups, each group comprising at least one control device configured to regulate the current of the energy storage;
determine which of the groups are affected by each received control signal;
store the received control signals in group specific lists;
compare the control signals within each group specific list to select the smallest current value; and
control operation of each control device according to the comparison.

8. The apparatus of claim 1, wherein the adjustment signal comprises a command to adjust a charging value according to the current value or to adjust a discharging value to the current value.

9. The apparatus of claim 1, wherein the control signals comprise a regulation request based on at least one of dynamic load management, static maximum current, frequency control, demand response, electricity supply and demand state, or building energy management.

10. The apparatus of claim 1, wherein the computer device is further configured to:
determine priorities for the control signals;
group the control signals into priority groups based on the determined priorities; and
compare the current values only within a top priority group with active control signals.

11. The apparatus of claim 1, wherein the computer device comprises:
at least one processor configured to control operations of the computer device;
a communications module configured to communicate with the at least one control device; and
at least one memory coupled to the at least one processor and the communications module, and configured to store program instructions which, when executed by the at least one processor, causes the device to perform the control operations.

12. The apparatus of claim 1, wherein the internet based communications comprises at least one of open charge point protocol, OCPP, open smart charging protocol, OSCP, and protocols of different manufacturers.

13. A method for energy management, the method comprising:
monitoring control signals from more than one adjustment system indicating a need to adjust operation of at least one energy storage, at least one adjustment system relating to one form of control indication and at least one other adjustment system relating to a second form of control indication;
receiving the control signals from more than one adjustment system;
converting two or more of the control signals into electrical current values despite the different forms of control indication used by the different adjustment systems;
comparing the control signals and selecting the one with the smallest current value; and
controlling operation of at least one control device configured to regulate the current of the energy storage based on the selection by dispatching an adjustment signal by internet based communication.

14. A non-transitory computer-readable medium comprising a computer program encoded with instructions that, when executed by at least one processing unit, causes the at least one processing unit to perform the acts of:
monitoring control signals from more than one adjustment system indicating a need to adjust operation of at least one energy storage, at least one adjustment system relating to one form of control indication and at least one other adjustment system relating to a second form of control indication;
receiving the control signals from more than one adjustment system;
converting two or more of the control signals into electrical current values despite the different forms of control indication used by the different adjustment systems;
comparing the control signals and selecting the one with the smallest current value; and
controlling operation of at least one control device configured to regulate the current of the energy storage based on the selection by dispatching an adjustment signal by internet based communication.

* * * * *